(12) United States Patent
Naylor et al.

(10) Patent No.: US 9,462,739 B2
(45) Date of Patent: Oct. 11, 2016

(54) AGRICULTURAL IMPLEMENT WITH COMPOUND HINGE ARRANGEMENT

(71) Applicant: CNH Canada, Ltd., Saskatoon (CA)

(72) Inventors: Matthew S. Naylor, Saskatoon (CA);
Dennis G. Thompson, Saskatoon (CA);
Dennis W. Chahley, Saskatoon (CA);
Darwin L. Zacharias, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 117 days.

(21) Appl. No.: 14/020,393

(22) Filed: Sep. 6, 2013

(65) Prior Publication Data

US 2015/0068779 A1    Mar. 12, 2015

(51) Int. Cl.
*A01B 73/04* (2006.01)

(52) U.S. Cl.
CPC .................... *A01B 73/046* (2013.01)

(58) Field of Classification Search
CPC .... A01B 73/02; A01B 73/04; A01B 73/042; A01B 73/044; A01B 73/046
See application file for complete search history.

(56) References Cited

U.S. PATENT DOCUMENTS

| 3,797,580 | A |   | 3/1974  | Roth |
| 3,844,358 | A | * | 10/1974 | Shuler et al. ................. 172/311 |
| 4,023,623 | A |   | 5/1977  | Anderson |
| 4,373,590 | A |   | 2/1983  | Wittrock |
| 4,467,875 | A |   | 8/1984  | Lewison |
| 4,576,238 | A |   | 3/1986  | Spencer |
| 4,612,997 | A |   | 9/1986  | Wilkins |
| 4,619,330 | A |   | 10/1986 | Machnee |
| 4,683,957 | A |   | 8/1987  | Bussiere |
| 4,862,758 | A |   | 9/1989  | Magee |
| 5,135,057 | A |   | 8/1992  | Dircks |
| 5,379,847 | A |   | 1/1995  | Snyder |
| 5,934,382 | A |   | 8/1999  | Wilkins |
| 6,213,219 | B1 |  | 4/2001  | Mosdal et al. |
| 7,497,269 | B2 |  | 3/2009  | Jagow |
| 8,122,970 | B2 |  | 2/2012  | Palen |
| 8,468,655 | B2 |  | 6/2013  | Borkgren et al. |
| 2011/0258811 | A1 | * | 10/2011 | Borkgren et al. ............. 16/319 |
| 2014/0060865 | A1 | * | 3/2014  | Maro et al. ................... 172/311 |
| 2015/0047863 | A1 | * | 2/2015  | Nyc et al. ..................... 172/311 |

* cited by examiner

*Primary Examiner* — Matthew D Troutman
(74) *Attorney, Agent, or Firm* — Rebecca L. Henkel (57) ABSTRACT

An agricultural implement is provided that includes a compound hinge arrangement that allows for compact folding adjacent frame segments such as wing segments of planting, seeding, or tillage implements. The compound hinge arrangement includes a first pivot axis that can be active when the implement is in an unfolded field-use position in which a second pivot axis of the compound hinge arrangement is locked. The implement may be folded into a folded transport position by pivoting an outer wing about the first pivot axis with a first actuator during a first stage and pivoting the compound hinge arrangement and the outer wing about the second pivot axis during a second stage.

18 Claims, 8 Drawing Sheets

AGRICULTURAL IMPLEMENT WITH COMPOUND HINGE ARRANGEMENT

FIELD OF THE INVENTION

The subject matter disclosed herein relates generally to the agricultural implements and, in particular, to implements with folding frame segments that allow for transporting the implements on the road in relatively compact configurations.

BACKGROUND OF THE INVENTION

Modern farming practices strive to minimize operating expenses. One way of reducing operating expenses is to increase the size of planting and seeding implements so as to reduce the amount of tractor operational time required for planting or seeding. When operating large planting and seeding implements, transporting such implements on the road between fields can present challenges. It is known to provide folding frame segments in large planting and seeding implements to allow the implements to be folded into transport positions and occupy a relatively less space on the road. Implements are known that use a single cylinder to fold an outer frame segment(s) through large ranges of motion, which can require numerous sliding interfacing components and/or complex linkages.

SUMMARY OF THE INVENTION

The present invention is directed to an agricultural implement that includes a compound lunge arrangement that allows for compact folding adjacent frame segments, such as wing segments, without requiring sliding interfaces that may be susceptible to wear, or complex linkages that may be expensive and may require substantial amounts of inspection or other maintenance. The compound hinge arrangement may allow for compact folding and narrow road transport while avoiding interference of adjacent ground-engaging tools mounted to the implement while in a folded transport position. This may be achieved by a single compound hinge arrangement that defines multiple pivot axes that allow an outer wing segment to both pivot with respect to an inner wing segment and lift with respect to the inner wing segment. This may increase clearance between the inner and outer wing segments when the implement is in a folded transport position. Of the multiple pivot axes, a first pivot axis may be active in an unfolded field-use position, allowing a frame of the agricultural implement to accommodate contours of a field during operation. The first pivot axis may be the only pivot axis allowed to articulate when the implement is in the unfolded field-use position. A second pivot axis may be locked when the implement is in the unfolded field-use position, but may be active during a folding procedure in a manner that may allow for moving the first pivot axis in an upward direction while further pivoting the outer wing segment for compactly folding the implement, which may lift an outer wing segment to increase clearance between the outer wing segment and an adjacent inner wing segment.

According to one aspect of the invention, an agricultural implement is provided with a compound hinge arrangement that allows an outer wing segment of an implement to be folded over an inner wing segment of the implement in multiple stages by way of multiple actuators operating in sequence and in cooperation with the compound hinge arrangement. This may allow for folding the agricultural implement into a relatively compact folded transport position having a relatively low center of gravity and relatively large clearances between adjacent portions of the implement.

According to one aspect of the invention, an agricultural implement is provided that defines an unfolded field-use position and a folded transport position. The agricultural implement includes an inner wing segment that supports a first ground-engaging tool(s) at a first position and an outer wing segment that supports a second ground-engaging tool (s) at a second position. The outer wing segment may be arranged transversely outward of the inner wing segment. A compound hinge arrangement may be arranged between the inner and outer wing segments. The compound hinge arrangement may define a first pivot axis at a point of intersection between the compound hinge arrangement and the outer wing segment and a second pivot axis at a point of intersection between the compound hinge arrangement and the inner wing segment. A first actuator may extend between the outer wing segment and the compound hinge arrangement and may be configured for selectively moving the outer wing segment with respect to the compound hinge arrangement. A second actuator may extend between the inner wing segment and the compound hinge arrangement and may be configured for selectively moving the compound hinge arrangement with respect to the inner wing segment. This may allow for compact folding of the wing segments and the folded transport position while allowing the wing segments to flex to accommodate contours of a field during operation.

According to another aspect of the invention, the compound hinge arrangement may define an upper portion and a lower portion. The first actuator may be connected to the upper portion of the compound hinge. The second actuator may be connected to the lower portion of the compound hinge. The first and second actuators may extend in generally opposite directions away from the compound hinge arrangement.

According to another aspect of the invention, a method is provided for folding an agricultural implement from an unfolded field-use position to a folded transport position. The method may include actuating a first actuator for pivoting a first frame segment of an agricultural implement to a first position corresponding to a partially folded position of the first frame segment with respect to a second frame segment of the agricultural implement. A second actuator may be actuated for pivoting the first frame segment to a second position corresponding to a folded position of the first frame segment with respect to the second frame segment of the agricultural implement.

According to another aspect of the invention, the method may include actuating a first actuator for pivoting an outer wing segment of an agricultural implement to a first position corresponding to a partially folded position of the outer wing segment with respect to an inner wing segment of the agricultural implement. A second actuator may be actuated for pivoting the outer wing segment to a second position corresponding to a folded position of the outer wing segment. The outer wing segment in the folded position may generally overlie the inner wing segment in an inverted position with respect thereto. A third actuator may be actuated for pivoting the inner and outer wing segments such that the inner and outer wing segments are arranged generally upright defining a folded transport position of the agricultural implement.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

The drawings furnished herewith illustrate a preferred construction of the present invention in which the above advantages and features are clearly disclosed as well as others which will be readily understood from the following description of the illustrated embodiment.

DETAILED DESCRIPTION

Figure 1:
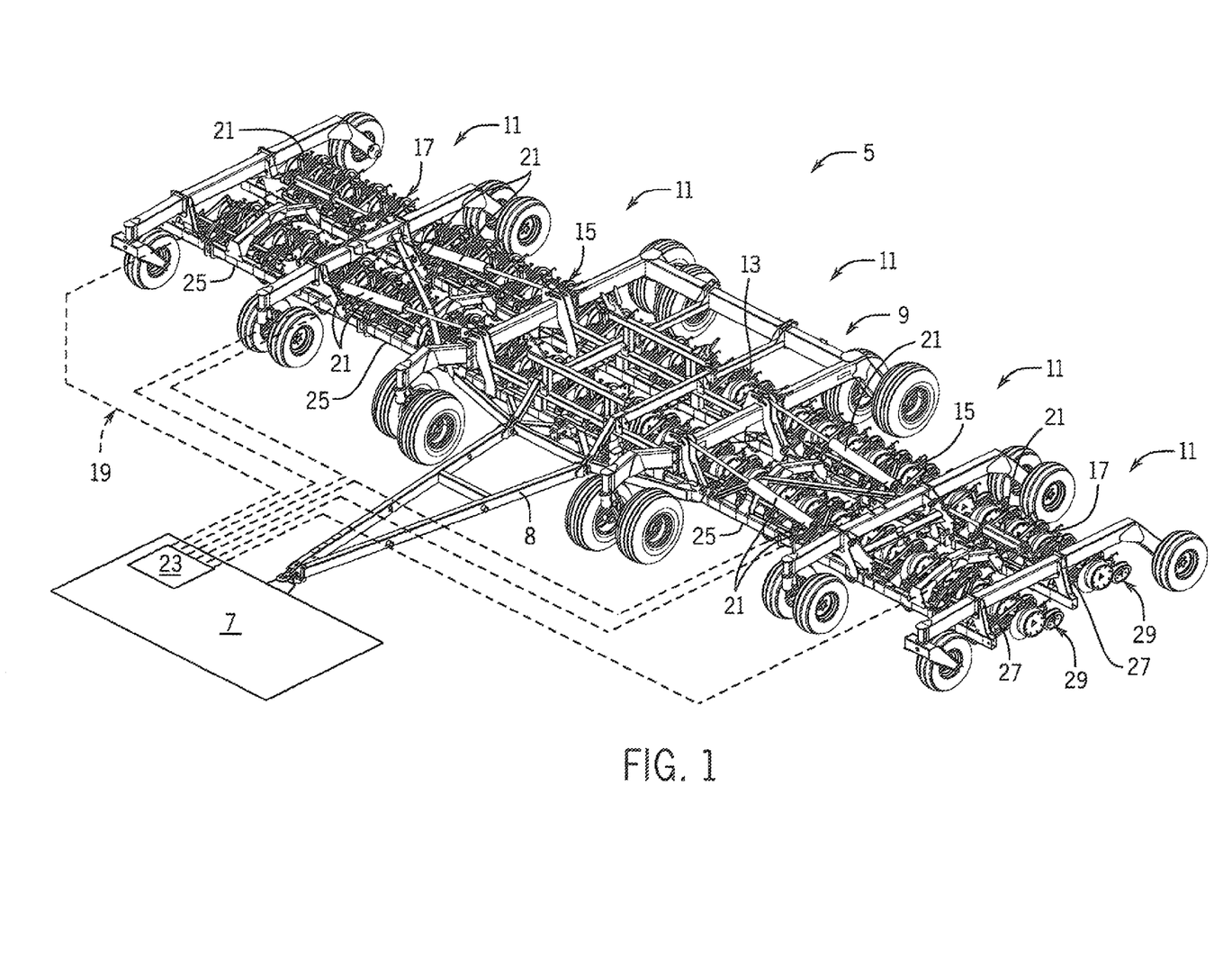
FIG. 1 is a partially schematic pictorial view of a tractor towing an agricultural implement that incorporates compound hinge arrangement in accordance with the present invention.

Referring now to the drawings and specifically to FIG. 1, an agricultural implement 5 is shown in an unfolded field-use position towed behind a tractor 7, shown in schematic form, by way of a drawpole 8 of the implement 5. The implement 5 can be folded into a folded transport position, as explained in greater detail elsewhere herein. The implement 5 may be any of a variety of planting and/or seeding implements with foldable frame segments and is schematically shown as a wing-up folding drill. For example, the implement 5 may be one of the PRECISION DISK™ series air drills available from Case IH. Implement 5 in this embodiment is configured as a five-plex wing-up folding drill having a frame 9 that includes multiple frame segments 11. The frame segments 11 define a main frame segment 13 that is arranged toward the center of the implement 5. A pair of inner wing segments 15 is arranged transversely outward of the main frame segment 13. A pair of outer wing segments 17 is arranged transversely outward of the inner wing segments 15. A folding system 19 of the implement 5 includes actuators 21A, 21B, 21C represented as hydraulic rams, although it is understood that the actuators 21A, 21B, 21C may instead be other actuator such as pneumatic or electromechanical actuators. Actuators 21A, 21B. 21C are operably connected to a control system 23 of the tractor 7 which may be a known hydraulic and corresponding hydraulic control system 23 of the tractor 7 for allowing an operator to control and fold the implement 5 from the unfolded field-use position into the folded transport position.

Still referring to FIG. 1, each of the frame segments 11 includes interconnected tubes 25 that define the framework of the respective main frame segment 13 and inner and outer wing segments 15, 17. The tubes 25 support toolbars 27 upon which ground-engaging tools 29 are arranged at each frame segment 11. Each of the ground-engaging tools 29 may include an opener which may be a furrow opening point, sweep, shovel, knife, coulter, or opener disk that opens a furrow to receive seed and/or fertilizer from a product delivery system of the implement 5, such as pneumatic delivery through product delivery tubes, in a known manner. The ground-engaging tools 29 may also include various tillage, furrow closing and/or packing devices.

Figure 2:
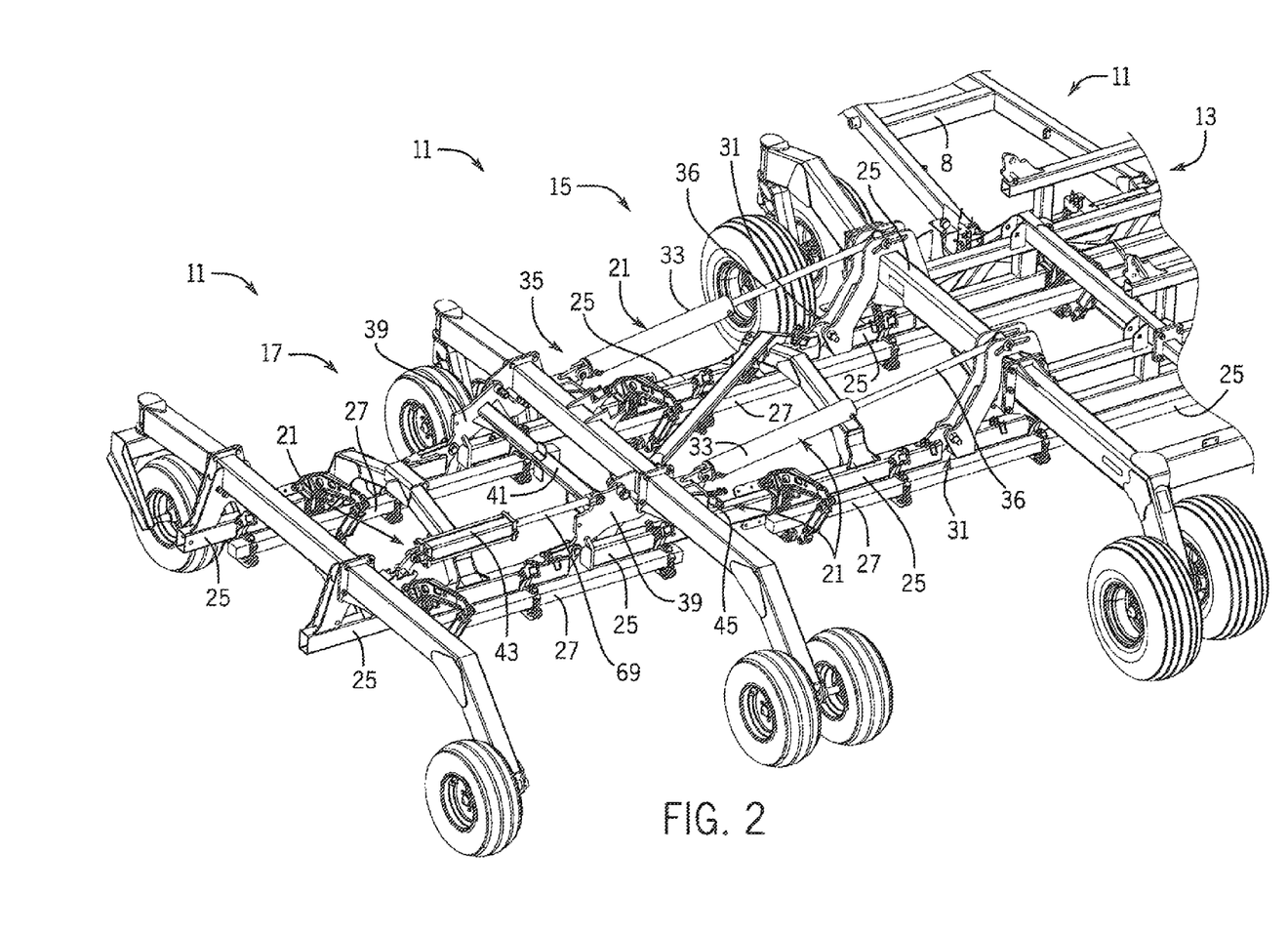
FIG. 2 is a pictorial view of a portion of the agricultural implement of FIG. 1.

Referring now to FIG. 2, a left-hand side portion of the implement 5 is shown from behind with various components such as the ground-engaging tools 29 removed to simplify the view. Description of the left-hand side portion of the implement 5 also applies to the right-hand side portion of the implement 5 as being substantially a mirror image of the left-hand side portion. An inner hinge 31 is arranged between the inner wing segment 15 and the main frame segment 13. As shown here, a first inner hinge 31 interconnects aligned tubes 25 of the main frame segment 13 and the inner wing segment 15 that extend transversely with respect to the implement 5, toward the front of the implement 5. A second inner hinge 31 interconnects aligned tubes 25 of the main frame segment 13 and the inner wing segment 15 that extend transversely with respect to the implement 5, toward the back of the implement 5. Between the main frame segment 13 and the inner wing segment 15, a pair of actuators 21A defines inner wing cylinders 33 having outer ends connected to an outer end 35 of the inner wing segment 15. Inner ends of the inner wing cylinders 33 are connected to the main frame segment 13 above and inboard with respect to the inner hinges 31, whereby the inner wing cylinders 33 extend angularly upwardly from the outer end 35 of the inner wing segment 15 toward the main frame segment 13. This arrangement allows the inner wing cylinders 33 to pivot the inner wing segment 15 about the hinges 31 by retracting rods 36 of into the inner wing cylinders 33, which pulls the outer end 35 of the inner wing segment 15 upward along an arcuate path.

Still referring to FIG. 2, a compound hinge arrangement 37 is arranged between the inner and outer wing segments 15, 17. The compound hinge arrangement 37 is configured to both pivot the outer wing segment 17 with respect to the inner wing segment 15 and lift the outer wing segment 17 with respect to the inner wing segment 15 so as to increase clearance between the inner and outer wing segments 15, 17 when the implement 5 is in a folded transport position. The compound hinge arrangement 37 includes a pair of pivot plates 39 that are interconnected for movement in Unison with each other by a bar 41. Between the compound hinge arrangement 37 and the outer wing segment 17, actuator 21B defines an outer wing pivot cylinder 43. Between the compound hinge arrangement 37 and the inner wing segment 17, actuator 21C defines a hinge lift cylinder 45. Although only one wing pivot cylinder 43 and hinge lift cylinder 45 are shown toward the back of the implement 5, it is understood that in another embodiment, the wing pivot cylinder 43 and the hinge lift cylinder 45 may be arranged toward the front of implement 5, in addition to or instead of those shown. Accordingly, the description of the wing pivot and hinge lift cylinders 43, 45 and the respective pivot plate 39 toward the back of the implement 5 are equally applicable to embodiments having wing pivot and hinge lift cylinders 43, 45 at the pivot plate 39 toward the front of implement 5.

Figure 3:
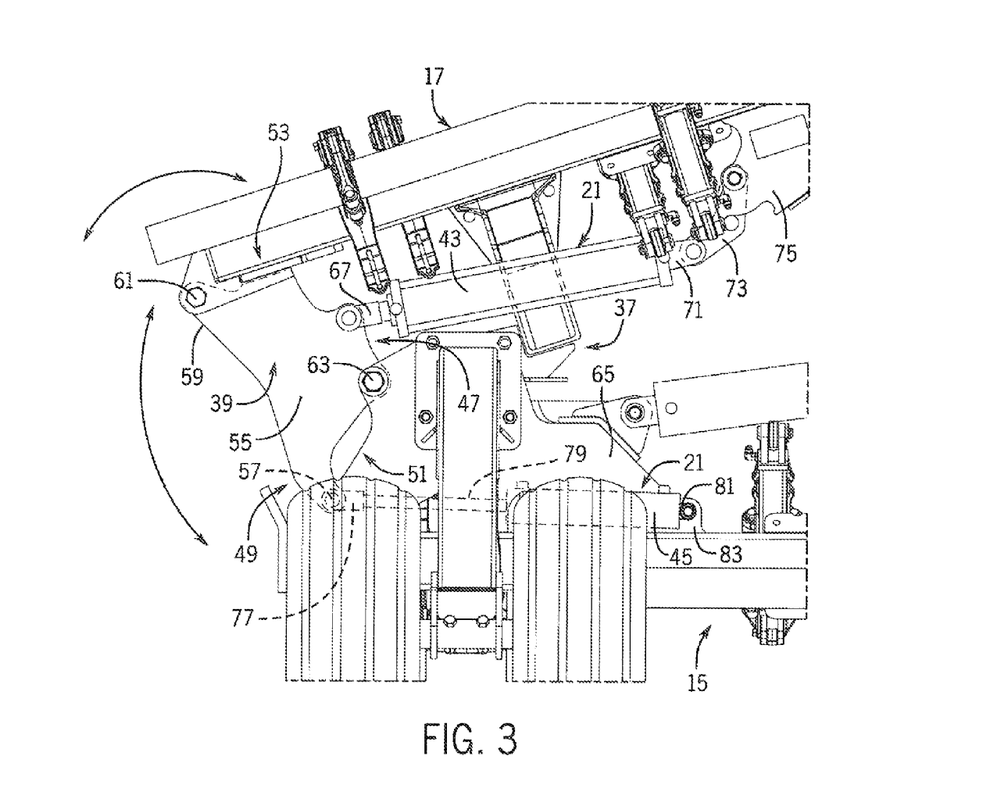
FIG. 3 is a close-up rear elevation view of a portion of the agricultural implement of FIG. 1.

Referring now to FIG. 3, pivot plate 39 has upper and lower portions 47, 49 and inner and outer portions 51, 53 corresponding to upper, lower, inner, and outer portions of the compound hinge arrangement 37. A main body 55 is defined at a central portion of the pivot plate 39. Arms 57, 59 extend in opposite directions from the main body 55 at the lower portion 49 of the pivot plate 39. A first pivot axis 61 is defined at a point of intersection between the outer wing segment 17 and the pivot plate 39 at arm 59 and thus between the outer wing segment 17 and the compound hinge arrangement 37. Pivot axis 61 defines au axis about which the outer wing segment 17 can pivot with respect to the pivot plate 39. A second pivot axis 63 is defined at a point of intersection between fixed plate 65 of the inner wing segment 15 and the pivot plate 39 at upper portion 47 and thus between the inner wing segment 15 and the compound hinge arrangement 37. Pivot axis 63 defines an axis about which the pivot plate 39 can pivot with respect to the inner wing segment 15.

Still referring to FIG. 3, movement of the outer wing segment 17 about the first pivot axis 61 is established by actuating the wing pivot cylinder 43. An end 67 of a rod 69 (FIG. 2) that is longitudinally movable while actuating wing pivot cylinder 43 is connected to the upper portion 47 of pivot plate 39. End 71 of the wing pivot cylinder 43 is connected to a link 73 that is connected to a lobe 75 of the outer wing segment 17. In this way, rod 69 may be extended from the wing pivot cylinder 43 when the implement 5 is in the unfolded field-use position, as shown in FIG. 2. When the implement 5 is in the unfolded field-use position, the wing pivot cylinder 43 may be set to a float setting, which allows the first pivot axis 61 to be unlocked or active so that the outer wing segment 17 can freely flex about the first pivot axis 61 to accommodate undulations in the field during use. In another embodiment, the link 73 may move to a central position during nominal field use. Movement of the link 73 around the pivot in lobe 75 may allow segment 17 to flex freely about the first pivot axis 61 to accommodate undulations in field during use.

Still referring to FIG. 3, movement of the compound hinge arrangement 37 about the second pivot axis 63 is established by actuating the hinge lift cylinder 45. An end 77 of a rod 79 that is longitudinally movable while actuating hinge lift cylinder 45 is connected to the arm 57 at the lower portion 49 of pivot plate 39. An end 81 of the hinge lift cylinder 45 is connected to a lobe 83 of the inner wing segment 15. In this way, rod 79 may be retracted into the hinge lift cylinder 45 when the implement 5 is in the unfolded field-use position, as shown in FIG. 2. When the implement 5 is in the unfolded field-use position, the hinge lift cylinder 45 may be set to a hold setting in which the rod 79 does not move with respect to the hinge lift cylinder 45. This locks the second pivot axis 63 so that pivot plate(s) 39 and compound hinge arrangement 37 are maintained in a fixed position relative to the inner wing segment 15 when the implement 5 is in the unfolded field-use position.

Figure 4:
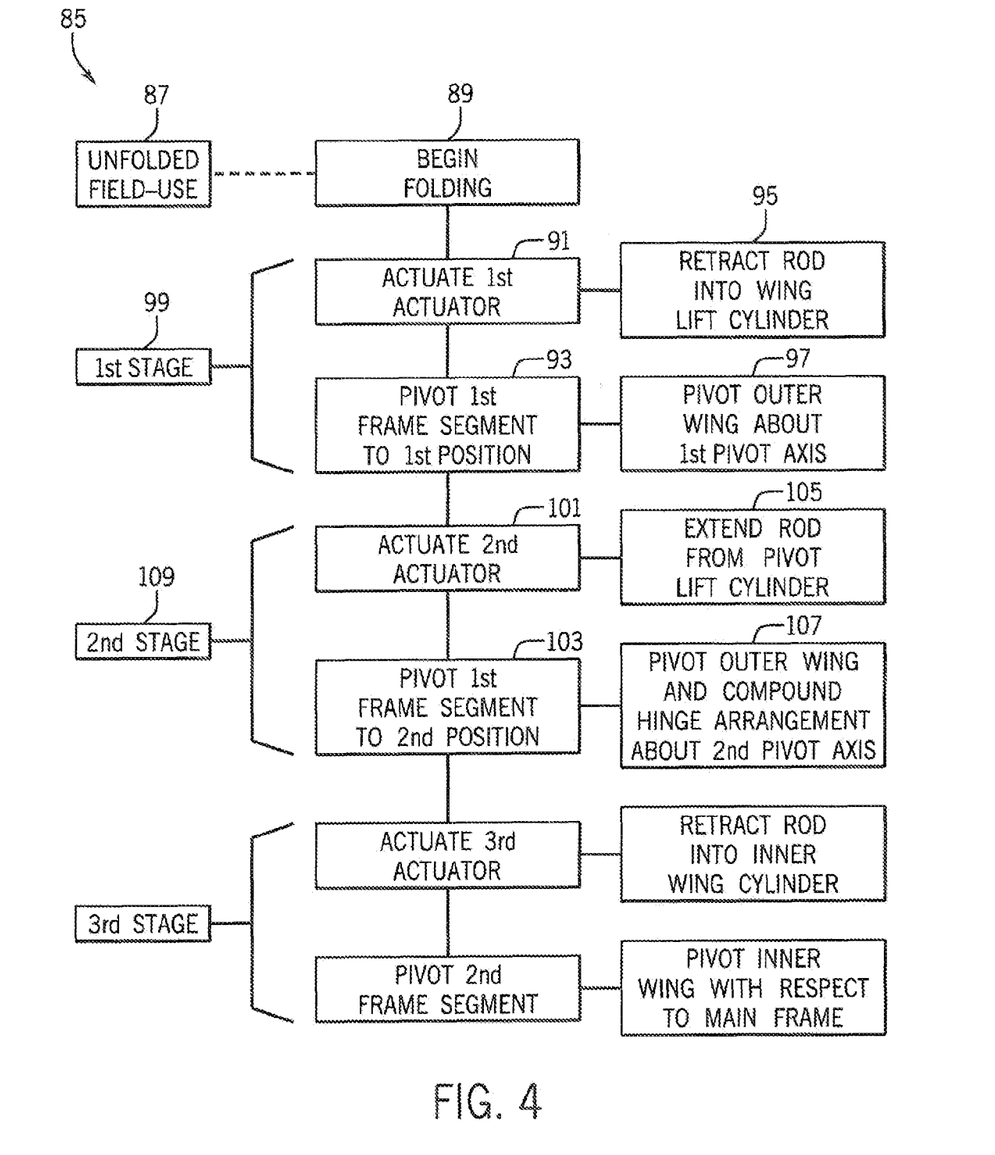
FIG. 4 is a flowchart of a folding procedure of the agricultural implement of FIG. 1.

Referring now to FIGS. 4-8, the folding system 19 of the implement 5 may be controlled to pivot the outer wing segment 17 and lift the outer wing segment 17 by way of the compound hinge arrangement 37, as represented by procedure 85 in FIG. 4. Referring now to FIG. 4, as represented at block 87, the implement 5 may be in an unfolded field-use position, such as that shown in FIG. 5. As described in greater detail elsewhere herein, the implement 5 is in the unfolded field-use position, the first pivot axis 61 may be active and the second pivot axis 63 may be locked.

Figure 5:
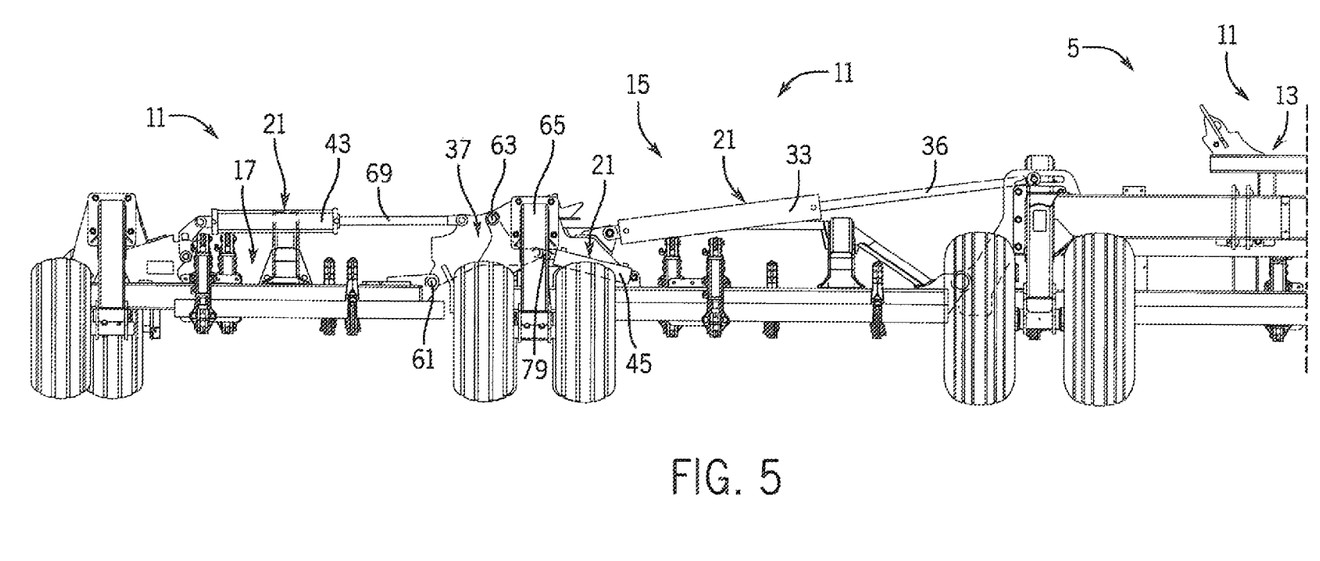
FIG. 5 is a rear elevation view of a portion of the agricultural implement in an unfolded field-use position.
Figure 6:
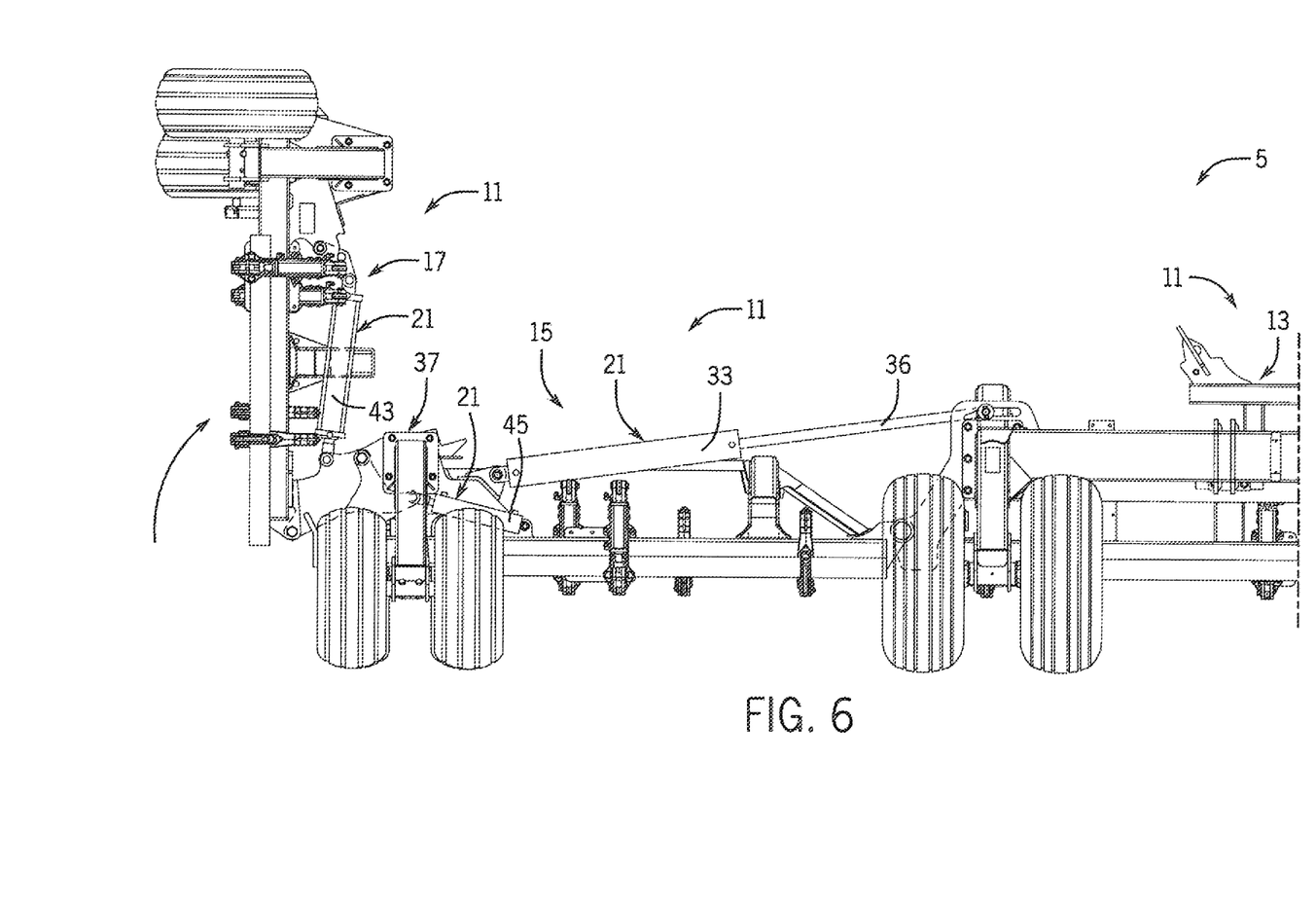
FIG. 6 is a rear elevation view of a portion of the agricultural implement with an outer wing segment in a partially folded position.

Referring again to FIG. 4 and with further reference to FIGS. 5 and 6, from the unfolded field-use position, folding may begin as represented at block 89. As represented at blocks 91 and 93, a first actuator 21B may be actuated to pivot a first frame segment 11 to a first position that corresponds to a partially folded position of the first frame segment 11. As represented at blocks 95 and 97, this may include retracting rod 69 into the wing lift cylinder 43 to lift the outer wing segment 17 along an arcuate path by pivoting the outer wing segment 17 about the first pivot axis 61. Such moving can be seen comparing the positions of the outer wing segment 17 in FIGS. 5 and 6. In FIG. 6, the outer wing segment 17 is in a first position away from the unfolded field-use position, defining the partially folded position of the outer wing segment 17. In this partially folded position, the outer wing segment 17 extends generally perpendicularly upward with respect to the underlying ground surface and the remainder of implement 5. The movement of the outer wing segment 17 from the unfolded field-use position to the upright partially folded position is represented at the bracket corresponding to block 99 as a first stage of the folding procedure.

Figure 7:
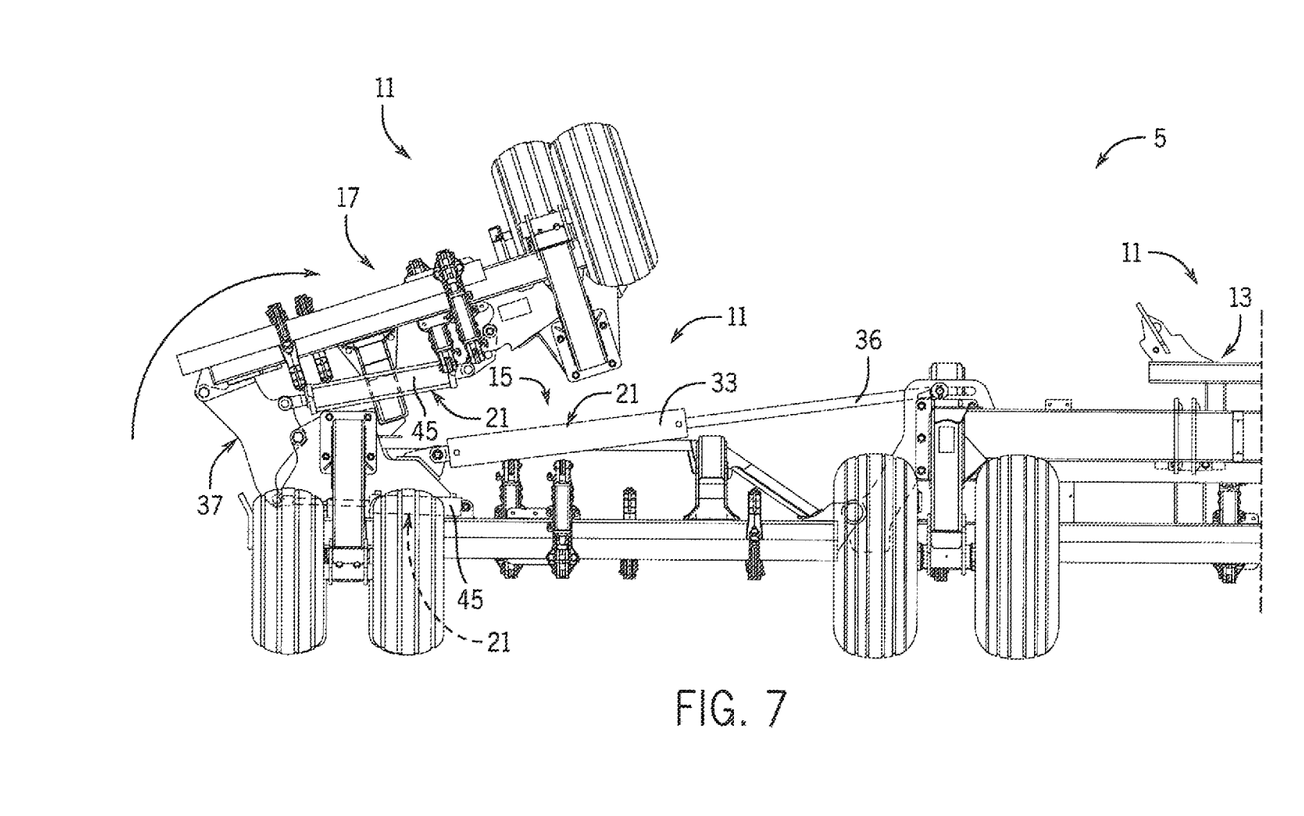
FIG. 7 is a rear elevation view of a portion of the agricultural implement with an outer wing segment in a folded position.

Referring again to FIG. 4 and with further reference to FIGS. 6 and 7, from the upright partially folded position at the first stage of the folding procedure, as represented at blocks 101 and 103, a second actuator 21C may be actuated to pivot the first frame segment 11 to a second position that corresponds to a folded position of the first frame segment 11 relative to a second position to adjacent frame segment 11. As represented at blocks 105 and 107, this may include extending rod 79 from the hinge lift cylinder 45. This pivots the compound hinge arrangement 37 about the second pivot axis 63, which correspondingly further pivots the outer wing segment 17 while at the same time lifting the first pivot axis 61 and thus also the inner end of the outer wing segment 17 because the first and second pivot axes 61, 63 are spaced from each other. Such moving can be seen comparing the positions of the outer wing segment 17 in FIGS. 6 and 7.

Referring now to FIG. 7, the outer wing segment 17 is in the second position away from the unfolded field-use position, defining the folded position of the outer wing segment 17. In this folded position, the outer wing segment 17 extends generally parallel with respect to the underlying ground surface and the remainder of implement 5. The outer wing segment 17 then generally overlies and is in an inverted position with respect to the inner wing segment 15. The movement of the outer wing segment 17 from the upright partially folded position to the folded position is represented at the bracket corresponding to block 109 as a second stage of the folding procedure. During the first and second stages of the folding procedure, the outer wing segment 17 may arrive at its folded position by traveling along a generally arcuate and partially lifting travel pathway of between about 125° and 180°, for example, about 160°, of rotation with respect to its position in the unfolded field-use position. The hinge arrangement 37 may rotate between about 45° and about 90°, for example, about 70°, while pivoting about the second pivot axis 63 during the second stage of the folding procedure.

Figure 8:
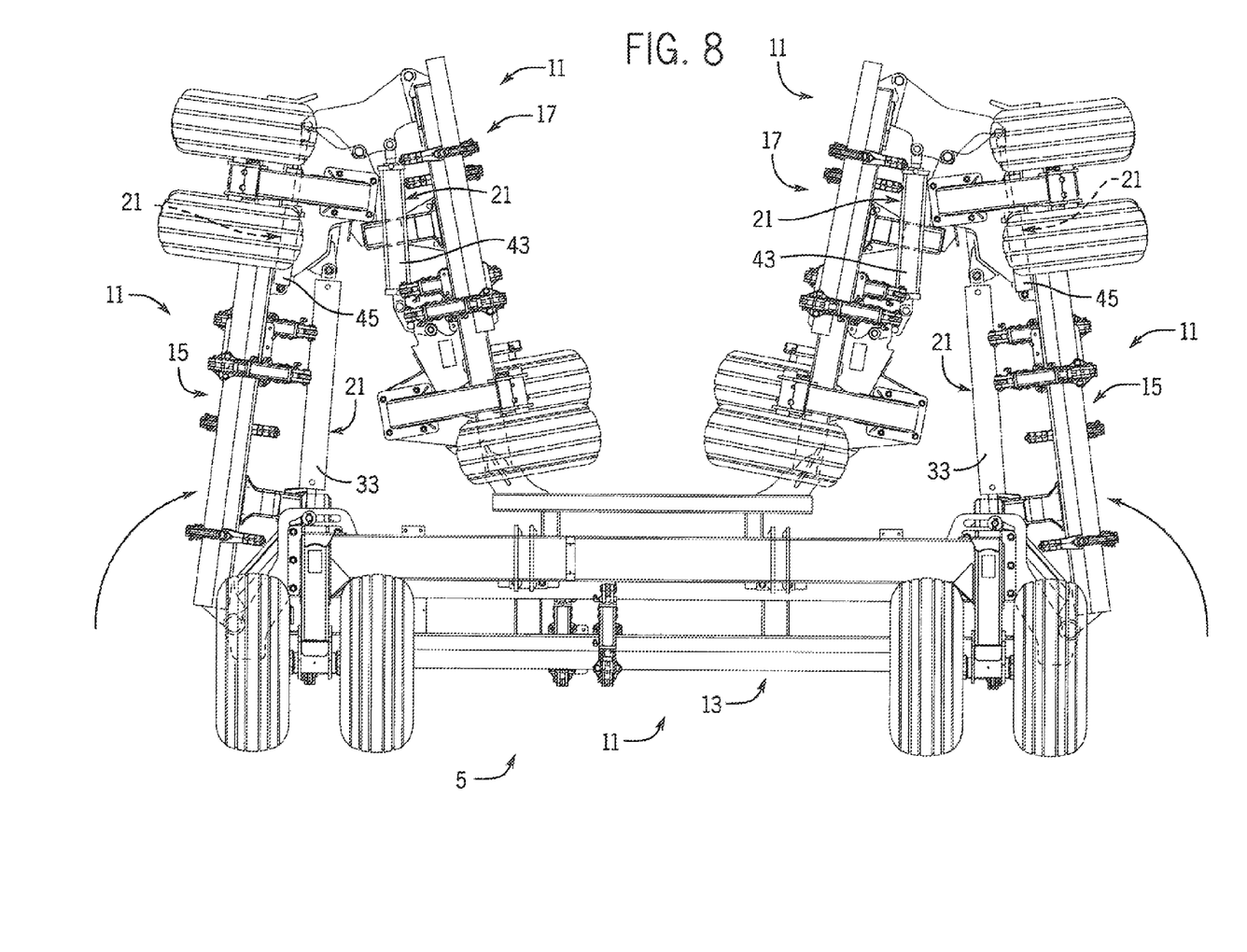
FIG. 8 is a rear elevation view of a portion of the agricultural implement in a folded transport position.

Referring again to FIG. 4 and with further reference to FIGS. 7 and 8, from the folded position of the outer wing segment 17 at the second stage of the folding procedure, as represented at blocks 111 and 113, a third actuator 21A may be actuated to pivot the second frame segment 11 with respect to a second frame segment 11. As represented at blocks 115 and 117, this may include retracting rod 36 into the inner wing cylinders 33. This pivots the inner wing segment 15 upwardly, which correspondingly pivots the outer wing segment 17 toward a middle portion of the implement 5. Such moving can be seen comparing the positions of the inner and outer wing segments 15, 17 in FIGS. 7 and 8.

Referring now to FIG. 8, the outer wing segment 17 is in a third position away from the unfolded field-use position, defining a double folded position of the outer wing segment 17. In this double folded position, the implement 5 defines a folded transport position suitable for on-road transport. When the implement 5 is in the folded transport position, the inner and outer wing segments 15, 17 define a generally M-shaped arrangement with the outer wing segments 17 toward the middle of implement 5 with respect to the lower surfaces facing each other. The inner wing segments 15 are arranged outwardly of the outer wing segment 17 with respective lower surfaces facing away from each other. The folding procedure may be performed substantially reversed to convert the implement 5 from the folded transport position to the unfolded field-use position.

Many changes and modifications could be made to the invention without departing from the spirit thereof. The scope of these changes will become apparent from the appended claims.

We claim:

1. A method of folding an agricultural implement from an unfolded field-use position to a folded transport position, the method comprising:
    pivotably connecting a first frame segment having a plurality of ground engaging tools to a second frame segment having a plurality of ground engaging tools with a compound hinge arrangement, the compound hinge arrangement:
        including a first pivot plate pivotably connected to the first frame segment along a first pivot axis and a second pivot plate fixed to the second frame segment and pivotably connected to the first pivot plate along a second pivot axis; and
        being free of ground engaging tools;
    actuating a first actuator pivotably connected to the first pivot plate and to the first frame segment, the first actuator including a rod extendable in response to actuation of the first actuator and being configured to move the first frame segment of the agricultural implement as the rod is extended to a first position by pivoting the first frame segment about the first pivot axis of the compound hinge arrangement, wherein the first position corresponds to a partially folded position of the first frame segment with respect to the second frame segment of the agricultural implement; and
    actuating a second actuator pivotably connected to the first pivot plate and to the second frame segment, the second actuator including a rod retractable in response to actuation of the second actuator and being configured to move the first frame segment of an agricultural implement as the rod of the second actuator is retracted to a second position by pivoting the first pivot plate about the second pivot axis of the compound hinge arrangement, wherein the second position corresponds to a folded position of the first frame segment with respect to the second frame segment of the agricultural implement.

2. The method of claim 1 wherein the first frame segment is defined at an outer wing segment of the agricultural implement and the second frame segment is defined at an inner wing segment of the agricultural implement and the compound hinge arrangement is arranged between the inner and outer wing segments.

3. The method of claim 2 wherein the first actuator is actuated during a first stage of a folding procedure and the second actuator is actuated during a second stage of the folding procedure.

4. The method of claim 3 wherein the outer wing segment pivots about the first pivot axis during the first stage of the folding procedure.

5. The method of claim 3 wherein the second pivot axis is defined at a point of intersection between the inner wing segment and the compound hinge arrangement.

6. The method of claim 5 wherein the first pivot axis is arranged lower than the second pivot axis when the implement is in the unfolded field-use position.

7. The method of claim 6 wherein the first pivot axis is moved upwardly during the second stage of the folding procedure.

8. The method of claim 3 wherein an inner hinge is arranged between the inner wing segment and a main frame segment of the agricultural implement and wherein a third actuator is actuated moving the inner wing segment with respect to the main frame segment.

9. The method of claim 8 wherein the inner wing segment is moved with respect to the mainframe segment of the third stage of the folding procedure.

10. The method of claim 9 wherein after the third stage of the folding procedure, the inner and outer wing segments are arranged generally upright to define a folded transport position of the agricultural implement.

11. The method of claim 10 wherein each of the inner and outer wing segments includes ground-engaging tools and wherein, the ground-engaging tools of the inner and outer wing segments face generally opposite directions when the agricultural implement is in the folded transport position.

12. A method of folding an agricultural implement from an unfolded field-use position to a folded transport position, the method comprising:
    pivotably connecting an outer wing segment having a plurality of ground engaging tools to an inner wing segment having a plurality of ground engaging tools with a compound hinge arrangement, the compound hinge arrangement:
        including a first pivot plate pivotably connected to the outer wing segment along a first pivot axis and a second pivot plate fixed to the inner wing segment and pivotably connected to the first pivot plate along a second pivot axis; and
        being free of ground engaging tools;
    actuating a first actuator pivotably connected to the first pivot plate and to the outer wing segment, the first actuator including a rod extendable in response to actuation of the first actuator and being configured to move the outer wing segment of the agricultural implement as the rod is extended to a first position corresponding to a partially folded position of the outer wing segment with respect to the inner wing segment of the agricultural implement by pivoting the outer wing segment about the first pivot axis;
    actuating a second actuator pivotably connected to the first pivot plate and to the inner wing segment, the second actuator including a rod retractable in response to actuation of the second actuator and being configured to move the outer wing segment as the rod of the second actuator is retracted to a second position corresponding to a folded position of the outer wing segment by pivoting the outer wing segment about the second pivot axis, wherein the outer wing segment in the folded position generally overlies the inner wing segment in an inverted position with respect thereto; and actuating a third actuator pivoting the inner and outer wing segments such that the inner and outer wing segments are arranged generally upright defining a folded transport position of the agricultural implement.

13. The method of claim 12 wherein the outer wing segment pivots about the first pivot axis during a first stage of a folding procedure and the outer wing segment pivots about the second pivot axis during a second stage of the folding procedure.

14. The method of claim 13 wherein the agricultural implement defines an unfolded field-use position and wherein the first pivot axis is active allowing relative movement between the outer wing and the compound hinge arrangement and the second pivot axis is locked preventing relative movement between the inner wing and the compound hinge arrangement when the agricultural implement is in the field-use position.

15. An agricultural implement defining an unfolded field-use position and a folded transport position, the agricultural implement, comprising:
   an inner wing segment supporting a first ground-engaging tool at a first position;
   an outer wing segment supporting a second ground-engaging tool at a second position, the outer wing segment arranged transversely outward of the inner wing segment;
   a compound hinge arrangement arranged between the inner and outer wing segments, the compound hinge arrangement:
      being free of ground engaging tools; and
      including a first pivot plate pivotably connected to the outer wing segment along a first pivot axis and a second pivot plate fixed to the inner wing segment and pivotably connected to the first pivot plate along a second pivot axis;
   a first actuator extending between the outer wing segment and first pivot plate of the compound hinge arrangement and including a rod extendable in response to actuation of the first actuator, the first actuator being configured to selectively move the outer wing segment about the first pivot axis to a partially folded position as the rod is extended;
   a second actuator pivotably connected to the first pivot plate and the inner wing segment and including a rod retractable in response to actuation of the second actuator, the second actuator being configured to selectively move the outer wing segment to a folded position by pivoting the outer wing segment about the second pivot axis as the rod the second actuator is retracted; and
   a third actuator extending between a main frame segment of the agricultural implement and the second pivot plate of the compound hinge arrangement and being configured for selectively folding the inner wing segment.

16. The agricultural implement of claim 15 wherein the first pivot plate of the compound hinge arrangement defines an upper portion and a lower portion and wherein the first actuator is connected to the upper portion of the first pivot plate and the second actuator is connected to the lower portion of the first pivot plate.

17. The agricultural implement of claim 15 wherein the first and third actuators extend in generally opposite directions away from the compound hinge with the agricultural implement in the unfolded field-use position.

18. The agricultural implement of claim 17 wherein the first pivot axis and the second actuator are arranged with respect to each other so that actuation of the second actuator moves the first pivot axis upwardly.

* * * * *